May 20, 1969 L. W. QUATROCHI ET AL 3,445,737
UNITARY FULL WAVE RECTIFIER PLATE
Filed Jan. 20, 1967
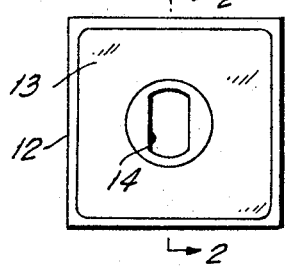
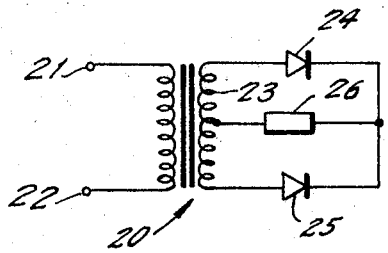
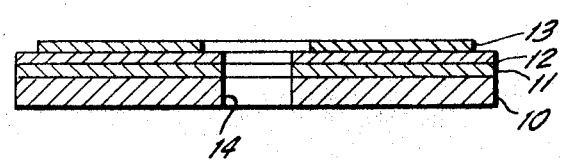
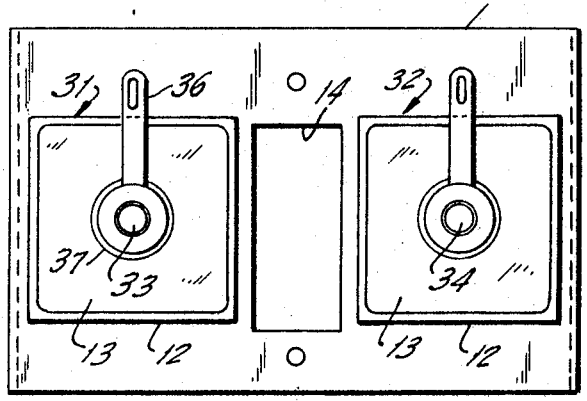
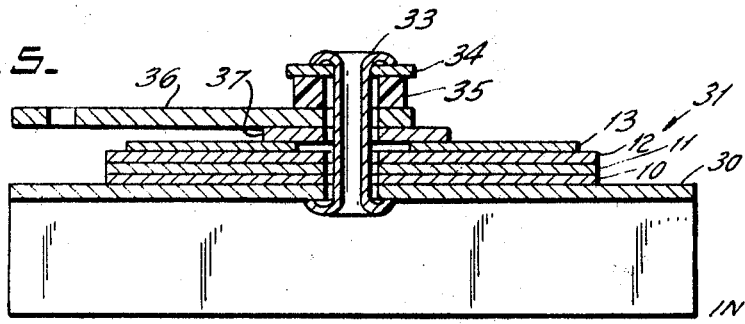
INVENTORS
LYLE W. QUATROCHI
JEFFERSON D. DANNER
BY OSTROLENK, FABER, GERB & SOFFEN
ATTORNEYS May 20, 1969  L. W. QUATROCHI ET AL  3,445,737
UNITARY FULL WAVE RECTIFIER PLATE
Filed Jan. 20, 1967  Sheet 2 of 2

INVENTORS
LYLE W. QUATROCHI
JEFFERSON D. DANNER
BY
OSTROLENK, FABER, GERB & SOFFER
ATTORNEYS

United States Patent Office 3,445,737
Patented May 20, 1969

3,445,737
UNITARY FULL WAVE RECTIFIER PLATE
Lyle W. Quatrochi, Palos Verdes, and Jefferson D. Danner, Manhattan Beach, Calif., assignors to International Rectifier Corporation, El Segundo, Calif., a corporation of California
Filed Jan. 20, 1967, Ser. No. 610,528
Int. Cl. H01l 3/02, 7/16
U.S. Cl. 317—234     4 Claims

ABSTRACT OF THE DISCLOSURE

A selenium rectifier plate in which the counter electrode is sprayed onto one surface of the plate in separate insulated sections. Individual contact is made to the insulated counter electrodes and a common contact is made to the main support plate with the device serving as a full wave, single phase bridge-connected rectifier. Separate spring contact clips fitted over the edge of the plate engage the separate counter electrode surfaces and are insulated from the base plate by an insulation sheet. The contact clips have upwardly extending regions to form convenient circuit connection points for the counter electrodes.

---

This invention relates to selenium rectifier plates, and more specifically relates to a novel construction for selenium rectifier plates in which the counter electrode for the single plate is formed of two insulated sections to define, with the common base plate, a single phase, full wave rectifier circuit.

There are many applications which call for the connection of selenium rectifier plates in single phase, full wave circuit arrangement. For example, there is a growing demand in the toy industry for an inexpensive D.-C. power supply in which a small housing will contain a rectifier transformer and two selenium rectifier elements connected in single phase, full wave arrangement.

In making such D.-C. power supplies, a sheet metal chassis is provided for mounting the rectifier transformer with two selenium rectifier plates clamped with their base plates directly in engagement with the metal chassis. The chassis then serves as the rectifier common point in the single phase full wave circuit with each of the rectifier plates having respective extending terminals which can be connected to the transformer secondary.

In such arrangements, economy and compactness is of great importance.

In accordance with the present invention, two rectifier elements are formed in a single plate by providing for a single plate having counter electrode surfaces which are electrically insulated from one another and cooperate with a common plate. In this manner, the cost of the single plate would be only slightly greater than the cost of a normal rectifier plate and considerably lower than the cost of two equivalent plates for defining the same single phase, full wave circuit. Moreover, considerable savings and space are obtained since only a single plate need be mounted, thereby contributing to an even greater saving in the overall volume of the complete power pack housing. It will be obvious that any number of circuit configurations can be constructed in accordance with the basic concept of the invention of the use of individual and insulated counter electrode regions on a common plate structure with its application to an integral single phase, full wave rectifier circuit being selected to illustrate the invention.

Accordingly, a primary object of this invention is to form a plurality of separate rectifier elements in a common selenium rectifier plate.

Yet another object of this invention is to produce an inexpensive and compact rectifier circuit.

Yet another object of this invention is to produce a plurality of rectifier elements having a common electrode in a single selenium plate to form an extremely compact arrangement for the plurality of rectifier elements.

Yet another object of this invention is to decrease the size of a D-C power supply housing.

These and other objects of this invention will become apparent from the following description when taken in connection with the drawings, in which:

FIGURE 1 is a top view of a prior art type of selenium rectifier plate.

FIGURE 2 is a cross-sectional view of FIGURE 1 taken across the lines 2—2 in FIGURE 1.

FIGURE 3 schematically illustrates a D-C power supply using a single phase, full wave connected rectifier circuit.

FIGURE 4 illustrates the manner in which two selenium rectifier plates have been mounted on a chassis to form a portion of the circuit of FIGURE 3.

FIGURE 5 is a cross-sectional view of FIGURE 4 taken across the lines 5—5 in FIGURE 4.

Figure 6:
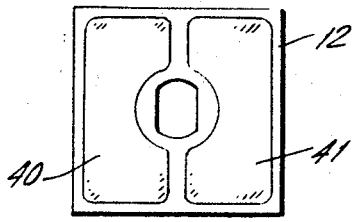

FIGURE 6 is a top view of a selenium rectifier plate constructed in accordance with the present invention.

Figure 7:
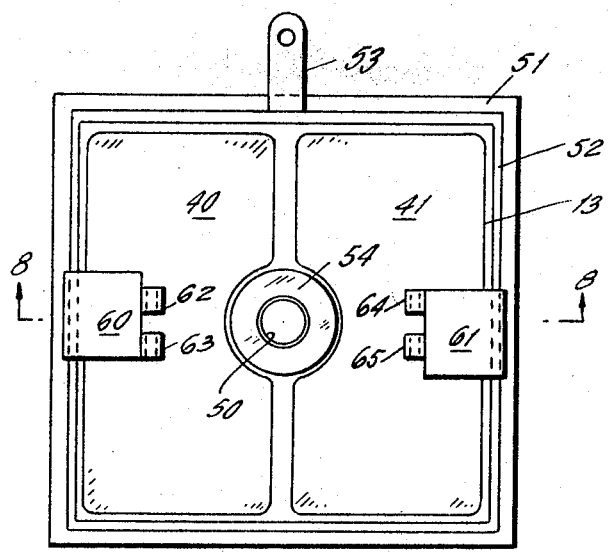

FIGURE 7 illustrates the manner in which the rectifier plate of FIGURE 6 is assembled with its suitable mounting hardward and terminal elements.

Figure 8:
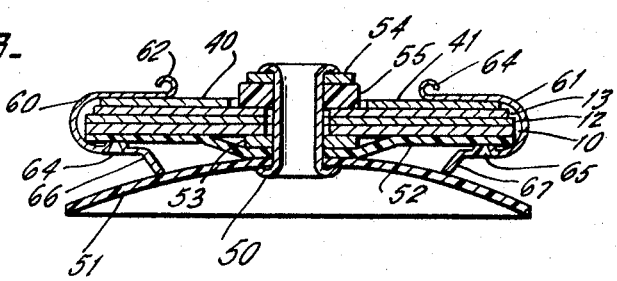

FIGURE 8 is a cross-sectional view of FIGURE 7 taken across the section line 8—8 in FIGURE 7.

Figure 9:
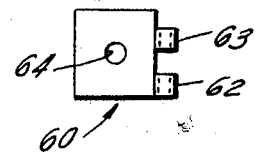

FIGURE 9 is a bottom view of one of the compact clips shown in FIGURES 7 and 8.

Referring first to FIGURES 1 and 2, there is illustrated a typical prior art selenium rectifier cell. Such cells are commonly formed on a steel or aluminum base plate 10 which has a selenium layer 11 deposited thereon. It is to be noted that the relative thicknesses of the various layers of the cell have been greatly exaggerated in the drawings for purposes of clarity. Thus, selenium layer 11 may have a thickness of from 0.002 to 0.006 inch and is formed in any of the well known manners. A barrier layer 12, which may be cadmium sulfide-cadmium selenide, is deposited atop the selenium layer 11 and forms the region in which rectification takes place. A counter electrode layer 13, which is a layer of a metallic alloy such as a bismuth cadmium alloy, is then sprayed atop layer 12 and forms the upper connection electrode of the cell with the base plate 11 serving as its opposite electrode. The cells are then processed by any of the well known electroforming techniques until the cell develops its desired rectification characteristics. A central opening 14 is provided in the plate for mounting of the plate. Selenium rectifiers of the type shown in FIGURES 1 and 2 are extremely old and well known and serve any general rectification purpose. They could, for example, be incorporated into circuits of the type shown in FIGURE 3 for use as a D-C power supply wherein a transformer 20, having input terminals 21 and 22 has its secondary winding 23 connected with rectifier elements 24 and 25 as shown with the load 26 connected between a center tap on winding 23 and to the junction of rectifiers 24 and 25. In this type circuit the rectifiers are connected as a single phase, full wave rectifier system.

FIGURES 4 and 5 illustrate the manner in which the rectifier elements 24 and 25 which are of the type shown in FIGURES 1 and 2 have been mounted in D-C power supplies of the single phase, full wave type. Thus, in FIGURES 4 and 5, the housing containing the D-C power supply will have a metallic chassis 30 which serves to mount the rectifier elements, the transformer and any of the other associated equipment for the power supply. FIGURES 4 and 5, however, only illustrate the mounting of two rectifier plates 31 and 33 to the surface of chassis 30 where the plates 31 and 32 serve, for example, as rectifier elements 24 and 25 of FIGURE 3. Each of plates 31 and 32 are identical to the plate of FIGURES 1 and 2 and are mounted by means of conductive eyelets 33 and 34, respectively, which pass through the openings in the center of their respective plates, such as opening 14 shown in FIGURE 5 for plate 31. The lower end of the eyelet bears directly on the bottom of a registering opening and plate 30, while the upper end of the eyelet bears atop a washer 34 which is compressed against an insulation spacer 35, which, in turn, bears against a terminal tab 36 which, in turn, bears against a conductive spring washer 37 which contacts the interior region of the counter electrode 13. Thus, one terminal of each of plates 31 and 32 defined by their base plates 10 are connected to the chassis 30, while their opposite terminals defined by the counter electrode 13 are electrically connected to the terminal tab 36.

In accordance with the present invention, a novel arrangement is provided whereby the two rectifier elements 24 and 25 of FIGURE 3 could be formed in a common plate.

This novel plate construction is illustrated in FIGURES 6 and 8 and differs from the construction of FIGURES 1 and 2 in that the counter electrode for the plate is sprayed on the barrier layer in two separate and insulated sections 40 and 41. In all other respects, the construction of the plate is identical to that of FIGURES 1 and 2. Thus, as shown in FIGURES 6 and 8, the novel dual rectifier plate is formed on a common base plate 10 having the usual selenium layer 12 and barrier layer 13 where, however, when the counter electrode is sprayed atop barrier layer 13, a mask is first placed over barrier layer 13 to prevent deposition of the counter electrode material on the central region illustrated in FIGURE 6. It will now be apparent that two rectifier elements are defined with a common plate which have as a common electrode the base plate 10, but which have separate and insulated counter electrodes 40 and 41, respectively.

The manner in which this novel dual plate may be mounted is illustrated in detail in FIGURES 7 and 8 where a mounting eyelet 50 captures two separate insulation sheets 51 and 52 and a terminal tab 53 (similar to terminal tab 36 in FIGURES 4 and 5) against the base plate 10. The upper end of the eyelet captures a washer 54 against insulation spacer 55 which seats directly atop the central exposed barrier layer 13 (and insulates counter electrodes 40 and 41 from the base plate 10), and the terminal tab 53.

A pair of conductive spring clips 60 and 61 are then provided to permit simple connection of leads to counter electrodes 40 and 41. Each of spring clips 60 and 61 have a general U-shape and have upwardly turned sections 62–63 and 64–65, respectively, to which good electrical connection can be made in order to electrically connect a lead to counter electrodes 40 and 41, respectively. In order to securely hold the spring clips 60 and 61 in position around the edges of the plate, inwardly stamped projections 64 and 65 are formed in the bottom legs of the clip, which projections grip into the surface of insulator sheet 52 as illustrated in FIGURE 8. Note that the insulation sheet 52 is necessary to prevent a short circuit of the counter electrodes 40 and 41 to the base plate 10.

It will be further noted that the clips 60 and 61 have downwardly bent end sections 66 and 67 on their lower sections to permit ease of assembly of the clips onto the plates.

This entire subassembly may now be mounted directly on a suitable chassis by any suitable bolt extending through eyelet 50 and connected to the chassis. The purpose of the insulation sheet 51 is to prevent electrical connection between clips 60 and 61 and the chassis where the chassis is at the potential of the terminal tab 53.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A selenium rectifier plate comprising a metallic base plate, a selenium layer extending across substantially the full upper surface of said metallic base plate, a barrier layer extending across substantially the full upper surface of said selenium layer, first and second counter electrode layers deposited on spaced areas of the upper surface of said counter electrodes discrete terminal means engaging at least two locations on said base plate and connecting to said counterelectrodes respectively, and electrical insulating means on the lower surface of said base plate insulating said terminal means from said plate and from each other.

2. The selenium rectifier plate of claim 1 which includes first, second and third terminal means connected to said base plate, said first counter electrode layer and said second counter electrode layer, respectively.

3. The selenium rectifier plate of claim 1 which includes a central opening extending through said selenium rectifier plate; an insulation sheet extending across the bottom surface of said metallic base plate; an elongated mounting means extending through said opening and fastening said insulation sheet to said base plate; and said discrete terminal means comprises first and second spring clip means fastened around the outer periphery of said rectifier plate; said first clip engaging said first counter electrode and the bottom surface of said insulation sheet; said second clip engaging said second counter electrode and the bottom susrface of said insulation sheet; said first and second spring clips forming terminals for connection to said first and second counter electrodes.

4. The method of manufacture of a full wave selenium rectifier plate comprising the steps of depositing a selenium layer over substantially the full upper surface area of a metallic base plate, depositing a barrier layer over substantially the full surface area of said selenium layer, masking a region of the exposed area of said barrier layer to expose at least two isolated areas, and spraying counter electrodes substantially over the full surface area of said barrier layer and mask, and removing said mask to define first and second isolated counter electrodes connected to a continuous barrier layer, providing a first terminal means on said basse plate, applying insulating means on the lower surface of said base plate, and applying second and discrete counter electrode terminal means on at least two locations of said base plate with said insulating means electrically separating said second discrete counter electrode terminal means from each other and from said base plate.

References Cited

UNITED STATES PATENTS

| 2,157,895 | 5/1939 | Hein | 317—234 |
| 2,221,616 | 11/1940 | Smith | 317—234 |
| 2,367,943 | 1/1945 | Hein | 317—234 |
| 2,412,989 | 12/1946 | Katterman | 317—234 |

JAMES P. KALLAM, *Primary Examiner.*

U.S. Cl. X.R.

29—589